Feb. 14, 1956  J. H. HOERN  2,734,402
REMOTE CONTROL MECHANISM FOR ADJUSTING ROTARY CUTTING TOOLS
Filed March 3, 1952  2 Sheets-Sheet 1

INVENTOR
Joseph H. Hoern.
BY Frank C. Fearman
ATTORNEY

United States Patent Office 2,734,402
Patented Feb. 14, 1956

2,734,402

REMOTE CONTROL MECHANISM FOR ADJUSTING ROTARY CUTTING TOOLS

Joseph H. Hoern, Saginaw, Mich.

Application March 3, 1952, Serial No. 274,549

13 Claims. (Cl. 77—4)

This invention relates to a control mechanism for adjusting rotating cutting tools used in connection with all types of boring and turning mechanism for turning and boring small parts and mechanical equipment of all kinds with great accuracy of dimension.

One of the prime objects of the invention is to design an adjustable control mechanism by means of which a rotating cutting tool can be quickly, easily and accurately adjusted to bore or turn a workpiece to predetermined dimension without interruption of the rotation of the cutting tool.

Another object is to provide a simple, manually actuated, remote control mechanism including a tool holder and cutting tool, and provide means connected to and remote from said holder for accurately and positively adjusting the turning or boring radius of the tool while the mechanism is in operation, and without disconnecting it, thus materially reducing the down time of the machine usually necessary when adjusting the cutting range of the tool in the conventional manner to change the size dimension of the work or compensate for tool wear.

A further object is to provide a pressure-actuated adjusting mechanism by means of which positive increments of adjustment of the adjusting mechanism can be secured to either increase or decrease the cutting range or diameter of the circular cutting path of the cutting tool.

Still a further object is to design a compact pressure-actuated adjusting means including a driven spindle and tool actuating shaft, and provide means for drivingly connecting said spindle and tool actuating shaft.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 3 is an enlarged, plan view of the driving plate.

Figure 1:
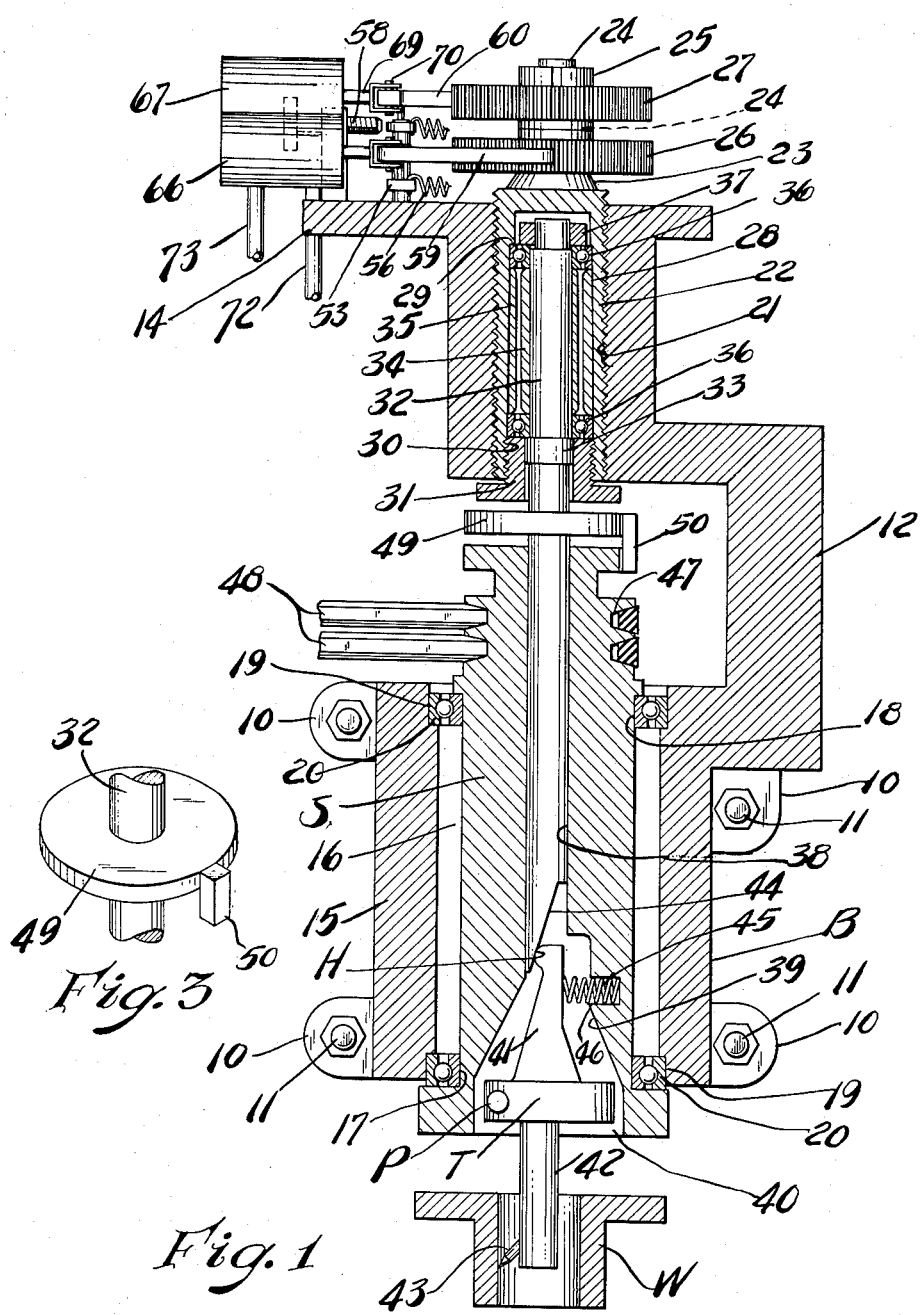
Fig. 1 is a vertical, part sectional, elevational view showing my remote control adjusting mechanism with the cutting tool in position in a typical workpiece.
Figure 2:
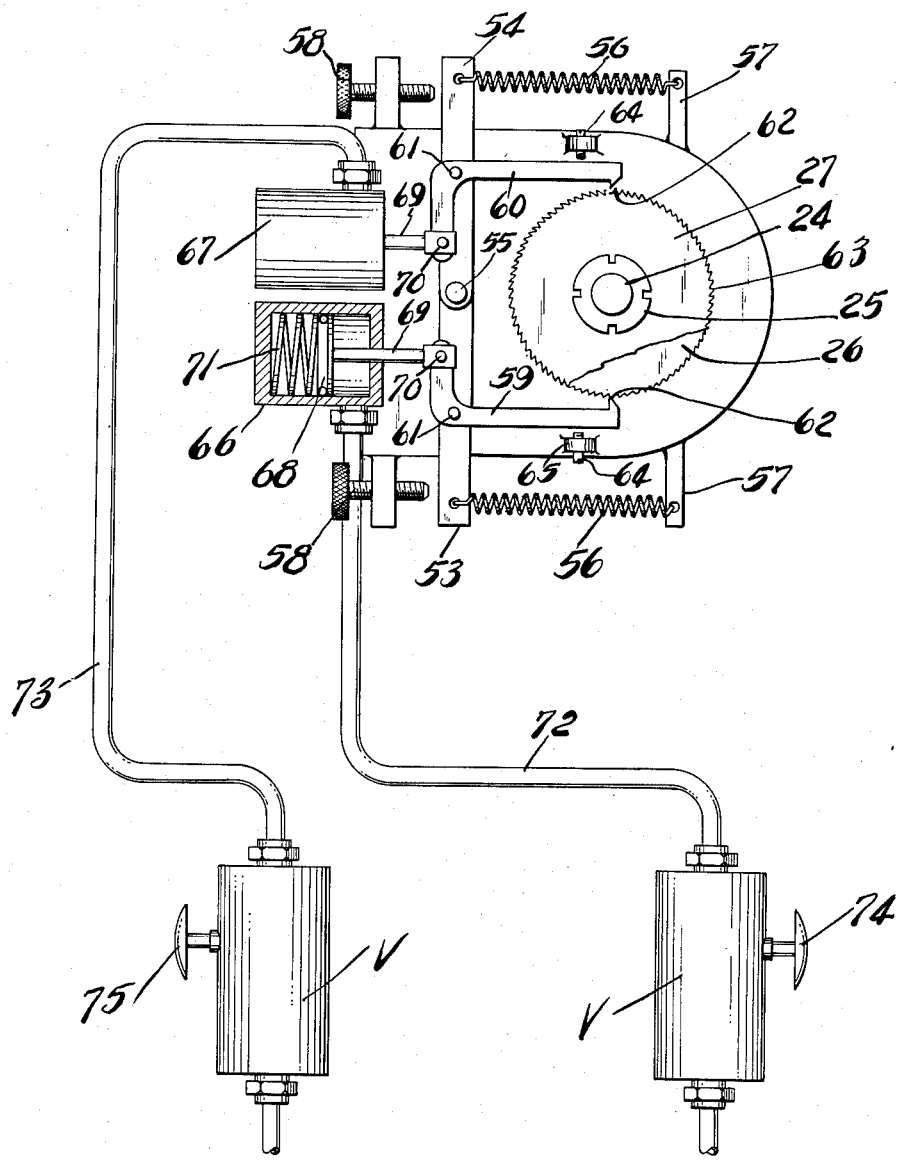
Fig. 2 is a top, plan view, one of the ratchet wheels being broken away to show the lower companion ratchet wheel.

Referring now more particularly to the drawings in which I have shown the preferred embodiment of my invention, the letter B indicates a bracket or other support forming a part of my tool adjusting control means and which is formed with laterally projecting lugs 10 accommodating bolts 11 to permit the bracket to be secured to a housing or the like (not shown). The bracket B can be of any desired shape, being preferably offset at a point intermediate its length as at 12, and the upper end is formed with a laterally projecting section 14, and for a purpose to be presently described.

The lower section 15 of the bracket B is centrally bored as at 16 to accommodate a spindle S, and enlarged, shouldered sections 17 and 18 are formed on said spindle. Turned sections 19 are provided in the bore 16, said shouldered and turned sections accommodating anti-friction bearing assemblies 20 therebetween as usual.

The upper end of the bracket B is also centrally bored and threaded as at 21 to accommodate an externally threaded, adjustable member 22, the upper end of said adjustable member being tapered as at 23 and terminating in a reduced shaft section 24, the end of which is threaded in the conventional manner to receive a nut 25 as usual. Ratchet wheels 26 and 27 are firmly mounted on the reduced shaft section 24 of the member 22 in superimposed relation, and the nut 25 serves to secure them in position.

The member 22 is hollow as shown, and is counterbored as at 28 to form a shoulder 29, the lower end section being internally threaded as at 30, and threadedly accommodates an adjusting nut 31. A vertically disposed shaft 32 extends into the member 22, and a sleeve and bearing assembly is interposed between the shoulder 29 and the enlarged section 33 of said shaft, said assembly including inner and outer sleeves 34 and 35, with anti-friction bearings 36 at the ends as shown, the nut 31 providing for adjustment of the bearings, and a nut 37 is provided on the upper end of the shaft.

The spindle S is centrally bored as at 38 to accommodate the shaft 32, the lower end section being outwardly tapered as at 39 and terminates in an enlarged, cylindrical bore 40 and in which a tool holder T is pivotally mounted at the point P, said holder being formed with a reduced, upwardly projecting section 41 formed with a contact head H, and a reduced shank portion 42 extends downwardly below the end of the spindle, and has a cutting tool 43 connected thereto in any desired manner, said cutting tool engaging a workpiece W, all as clearly shown in Fig. 1 of the drawings.

The lower end of the shaft 32 is angled as at 44 for engagement with the contact head H, and a spring 45 is mounted in a transversely disposed bore 46 and bears against the section 41 to yieldingly force the contact head H into engagement with the angled surface 44 at all times, and it will be obvious that the angle of inclination of the tool holder is controlled by the vertical travel of the shaft 32 which swings the tool holder about its pivot point P to increase or decrease the radius of the circular path of travel of the cutting tool.

The spindle S can be driven from any convenient source of power, such as a motor (not shown) or the like, and grooves 47 are provided in the body of the spindle to accommodate belts 48 as usual.

The shaft 32 is drivingly connected to the spindle S, a driving member 49 being mounted on the shaft 32 directly above the spindle, said member including a depending detent or tooth 50 engageable in a notch 51 provided in the upper flanged end 52 of the spindle, said tooth being vertically movable in the notch 51 to permit any desired adjustment.

The mechanism for actuating the ratchet wheels 26 and 27 is mounted on the bracket projection 14 and is identical for each wheel, said mechanism comprising horizontally disposed bars 53 and 54 pivotally connected to the section 14 by means of a pin 55, and a coil spring 56 is anchored to the free end of each bar and to a post 57 mounted on the bracket to provide tension on the bars at all times. Adjusting screws 58 are also mounted on the bracket 14 in alignment with the members 53 and 54, so that movement thereof can be regulated to permit desired adjustment.

Bell crank shaped ratchet members 59 and 60 are mounted on the bars 53 and 54 at a point 61, each ratchet having a toothed end 62 for engagement with the teeth 63 of the ratchet wheel, and stops 64 are adjustably mounted in lugs 65 provided on the section 14, and are disposed in horizontal alignment with the edges of the ratchets to limit outward travel thereof. The disposition of the stops 64 is such that the members 59 and 60 may normally be just out of engagement with the ratchet wheels 26 and 27 respectively.

Air cylinders 66 and 67 are mounted on the one edge of the section 14 in any desired manner, each cylinder including a piston 68 and a rod 69 which is pivotally connected to one end of each ratchet by means of pins 70, a spring 71 being provided in each cylinder and is interposed between the end wall and the piston 68 for returning the piston rods to retracted position after they have been actuated.

Air lines 72 and 73 lead to the respective air cylinders 66 and 67, and a control valve V is interposed intermediate the length of each line, said valves having push buttons 74 and 75 which, when actuated, admit a pressure medium to the cylinders 66 and 67 to move the piston rod 69 one increment, or a distance equivalent to one or a predetermined number of the teeth on either of said ratchet wheels, the ratchet wheel 26 rotating the member 22 clockwise, while the other ratchet wheel 27 rotates the companion wheel counterclockwise, thus raising or lowering the adjustable member 22 and shaft 32 to adjust the tool holder accordingly. The members 59 and 60 are normally out of engagement with the wheels 26 and 27 until one or the other of the valves V is actuated.

In practice, the operation of the device is as follows. When it is desired to bore a workpiece W to certain predetermined diameter, the workpiece is first inserted in a suitable chuck (not shown); the mechanism is set quickly at roughly approximate position, after which the push buttons 74 and 75 can be individually actuated to swing the tool holder T about its pivot point P and adjust the cutting tool to proper radius to suit the dimension desired. The operator merely pushes the push button once, twice, or the number of times necessary to provide the correct setting.

Actuation of these push buttons rotates one of the ratchet wheels a predetermined distance or a certain number of increments each time, the distance being regulated by the spacing of the teeth 63, or the travel of the rod 69. Actuation of the push button rotates the ratchet wheels and adjusts the member 22 and shaft 32 downwardly as a unit, so that the diameter of the circle or path of travel of the cutting tool will be increased, and conversely, actuation of the push button 75 rotates the ratchet wheel 26 in the opposite direction. This raises the members 22 and 32 and decreases the diameter of the circle or path of travel of the tool, and it will be obvious that any vertical movement of the shaft will swing the tool holder about its pivot point P and adjust the radius of travel of the cutting tool accordingly. This can be done while the machine is in operation, thus eliminating the down time and labor usually necessary when setting up, or when adjustment is required when the machine is in operation.

While in the present instance I have shown the mechanism operable by a suitable pressure actuated means, it will be obvious that solenoids or manually actuated rods and levers may be utilized without departing from the spirit of the invention.

The device is very simple, practical and economical; it permits easy, quick and accurate adjustment even when the machine is in operation, conserving time and effort usually necessary when adjusting in the conventional manner.

What I claim is:

1. A control mechanism for adjusting rotating cutting tools comprising a support, a bored spindle revolvably mounted therein, a tool holder adjustably mounted in said spindle, an adjustable member in said support in axial alignment with said bored spindle, a shaft journaled in said adjustable member with its lower end extending into the spindle bore for relative movement along the axis thereof and for adjusting engagement with said tool holder, a pair of axially spaced ratchet wheels on said adjustable member, a pair of bell crank levers pivotally mounted on said support on opposite sides of said wheels, each of said bell crank levers being co-planarly arranged with a wheel and being formed with an inwardly projecting ratchet on the end thereof, and a pressure fluid system for actuating said adjustable member and shaft to adjust said tool including individual cylinders having plungers therein connected to said bell crank levers.

2. A control mechanism for adjusting rotating cutting tools comprising a support, a centrally bored spindle revolvably journaled in said support, a tool holder adjustably mounted in the bored spindle, an adjusting member with a shaft journaled therein threaded in said support in axial alignment wiht the axis of the spindle, said shaft extending into the spindle bore into adjusting engagement with said tool holder and being mounted for relative movement along the longitudinal axis of said bore, ratchet mechanism for selectively actuating said adjusting member and shaft in a clockwise and counterclockwise direction to adjust said tool holder, remotely controlled means for actuating said ratchet mechanism, and means for driving said spindle.

3. A control mechanism for adjusting rotating cutting tools comprising a support, a bored spindle journaled in said support, a tool holder adjustably mounted in said bore, an adjustable member threaded in said support adjacent said spindle and in axial alignment therewith, a shaft journaled in said adjustable member with its free end extending into said spindle bore and into adjusting engagement with said tool holder, and mechanically actuated indexing means for revolving said member only defined increments connected to said adjustable member for actuating said member and shaft axially to adjust said tool holder.

4. A control mechanism for adjusting rotating cutting tools comprising a bracket, a bored spindle revolvably journaled in said bracket, a tool holder rockably mounted in the bored spindle, an axially adjustable member threaded in the upper end of the bracket in axial alignment with said spindle, a shaft journaled therein and adjustable axially therewith with its lower end extending into said bored spindle, into adjusting engagement with said tool holder, a ratchet wheel on the adjusting member, and ratchet means cooperable with said wheel for actuating said adjustable member and shaft axially to adjust said tool holder about its pivot point.

5. A control mechanism for adjusting rotating cutting tools comprising a support, a bored spindle revolvably mounted therein with the lower end of the bore opening into an enlarged chamber, a tool holder adjustably mounted in said chamber at a point interjacent its ends, an adjustable member mounted in said support in axial alignment with said spindle, a shaft revolvably mounted in said adjustable member and adjustable therewith axially, with its free end in actuating engagement with said tool holder, ratchet wheels mounted on the adjustable member, and pressure-actuated means for rotating said ratchet wheels to adjust said adjustable member and shaft and actuate said tool holder.

6. The combination defined in claim 5 in which a ratchet is provided for each ratchet wheel, said pressure-actuating means actuating said ratchets to selectively rotate one ratchet wheel in a clockwise direction, and the other ratchet wheel in a counter-clockwise direction.

7. The combination set forth in claim 5 in which the pressure-actuated means is connected to a source of pressure supply, and push button actuated valves interposed between said pressure supply and the pressure-actuated means for admitting pressure to said pressure-actuated means when the push buttons are actuated.

8. In a mechanism of the character indicated, a bracket having an offset section intermediate its length, a centrally bored spindle revolvably mounted in the one end section of said bracket, a tool holder rockably mounted at a point intermediate its length in said bore, a threaded bore in the opposite end section of the bracket in axial alignment with said spindle, a threaded member adjustably mounted in said threaded bore, a shaft journaled in said threaded member and movable axially therewith, with its opposite end extending into said bored spindle and terminating in an angled end section, ratchet wheels mounted on said threaded member, an individual toothed ratchet engageable with each ratchet wheel, and an individual pressure-actuated member engageable with each ratchet for actuating the ratchet wheel to axially adjust said threaded member and shaft and rock said tool holder about its pivot point.

9. The combination defined in claim 8 in which the one end of the spindle is turned to form belt-accommodating grooves, belts in said grooves connected to a source of power, and means for drivingly connecting said spindle and shaft.

10. The combination set forth in claim 8 in which a clutch plate is provided on the shaft directly adjacent said spindle, said plate being longitudinally slidable with relation to said spindle to compensate for shaft adjustments, and means for driving said spindle.

11. The combination defined in claim 1 in which springs are provided in said cylinders to return said plungers to normal position, and stops are provided on said support to limit outward movement of said bell crank levers.

12. A control mechanism for adjusting rotating cutting tools comprising a support, a bored spindle revolvably mounted therein with the lower end of the bore opening into an enlarged chamber, a tool holder adjustably mounted in said chamber at a point interjacent its ends, an adjustable member mounted in said support in the axial plane of said spindle, a shaft revolvably mounted in said adjustable member and adjustable axially therewith with its free end in actuating engagement with said tool holder, a ratchet wheel mounted on the adjustable member, and pressure-actuated means for rotating said ratchet wheel to adjust said shaft and actuate said tool holder.

13. A control mechanism for adjusting rotating cutting tools comprising a support, a bored spindle revolvably mounted therein, a tool holder adjustably mounted in said spindle, an adjustable member in said support in axial alignment with said bored spindle, a shaft journaled in said adjustable member with its lower end extending into the spindle bore for relative movement along the axis thereof and for adjusting engagement with said tool holder, a pair of axially spaced ratchet wheels on said adjustable member, a post centrally mounted on said support adjacent said wheels, a pair of bar levers pivotally mounted on said post and extending in opposite directions therefrom, a pair of bell crank levers pivotally mounted on said bar levers on opposite sides of said wheels, each of said bell crank levers being co-planarly arranged with a wheel and being formed with an inwardly projecting ratchet on the end thereof, springs parallel with said bell levers connected between said bar levers and support to tension said bar levers, and a pressure fluid system for actuating said adjustable member and shaft to adjust said tool including individual cylinders having plungers therein connected to said bell crank levers.

References Cited in the file of this patent

UNITED STATES PATENTS

| | | |
|---|---|---|
| 1,233,994 | Dow | July 17, 1917 |
| 2,540,520 | Hoern | Feb. 6, 1951 |